United States Patent [19]

Wynn et al.

[11] 4,104,413

[45] Aug. 1, 1978

[54] PREPARATION OF IMITATION CHEESE

[75] Inventors: John Dee Wynn; George Terrance Denton, both of Plano; Richard Judd Bell, Sherman; Harry Rowe Vernon, Dallas, all of Tex.; Lloyd Roy Custer, Columbus, Ohio

[73] Assignee: Anderson, Clayton & Co., Houston, Tex.

[21] Appl. No.: 478,032

[22] Filed: Jun. 10, 1974

Related U.S. Application Data

[63] Continuation-in-part of Ser. No. 217,997, Jan. 14, 1972, abandoned.

[30] Foreign Application Priority Data

Feb. 17, 1971 [IE] Ireland ................................. 190/71
Sep. 16, 1971 [GB] United Kingdom ............... 43145/71

[51] Int. Cl.$^2$ ........................ A23C 19/02; A23C 19/12
[52] U.S. Cl. .................................... 426/582; 426/519

[58] Field of Search ............... 426/188, 189, 356, 361, 426/519, 582

[56] References Cited

U.S. PATENT DOCUMENTS

| 2,009,238 | 7/1935 | Parsons | 426/519 X |
|---|---|---|---|
| 3,310,406 | 3/1967 | Webster | 426/189 X |
| 3,359,116 | 12/1967 | Little | 426/361 X |
| 3,397,995 | 8/1968 | Elenbogen | 426/189 |
| 3,806,606 | 4/1974 | Seiden | 426/582 X |

FOREIGN PATENT DOCUMENTS 2,058,207  6/1971  Fed. Rep. of Germany.

*Primary Examiner*—David M. Naff
*Attorney, Agent, or Firm*—Fulbright & Jaworski

[57] ABSTRACT

A food resembling pasta filata cheese or cheddar cheese is produced by forming a substantially gas-free homogeneous blend of fat, water, calcium caseinate, ungelatinized flour and certain acids. The blend is formed under high shear mixing at subatmospheric conditions.

13 Claims, 2 Drawing Figures

PREPARATION OF IMITATION CHEESE

CROSS-REFERENCES TO RELATED APPLICATIONS

This is a continuation-in-part of U.S. Pat. application No. 217,997, now abandoned, filed Jan. 14, 1972 by the same inventors in Group Art Unit 172 for Food Resembling Cheese and Process For Making Same.

BACKGROUND OF THE INVENTION

The field of art to which the invention pertains is a food product resembling cheese or, in other words, imitation cheese. The particular cheeses that are resembled are the pasta filata and cheddar types.

Applicants understand there are certain imitation cream cheeses on the market and know that imitation cream cheeses are described in U.S. Pat. No. 3,397,994 issued Aug. 20, 1968, entitled "Imitation Cream Cheese Spread Containing Polyunsaturated Fat", and in U.S. Pat. No. 3,397,995 also issued Aug. 20, 1968, and entitled "Edible Dietary Spread and Method of Making Same". However, Applicants were not aware of any imitation pasta filata or cheddar type cheese at the time of filing the parent application No. 217,997.

SUMMARY OF THE INVENTION

It is a general object of the present invention to provide a food resembling pasta filata or cheddar type cheese and the process of making the same. A more particular object of the present invention is to provide such a food which is less expensive than real pasta filata or cheddar type cheese. The imitation cheeses of the present invention are particularly suitable for use in such dishes as enchiladas, pizzas, tacos, sandwiches, sauces and other prepared foods in place of ordinary cheese.

Other and further objects, features and advantages will be apparent from the following description of the invention given for the purpose of disclosure.

The present invention is based upon the discovery that a food resembling pasta filata or cheddar type cheese can be economically produced by forming a substantially gas-free homogeneous blend of (a) an emulsion of water with a fat having a Wiley melting point between about 90° and 110° F., the fat being about 12 to 35% of the food, (b) about 15 to 33% calcium caseinate, preferably about 25%, (c) up to about 5% ungelatinized flour, and (d) about 0.5 to 1.8% adipic, lactic, citric, or malic acid, or combinations of such acids, the food having a pH of about 4.8 to 5.7 and including appropriate coloring and flavoring materials. In some instances, the ungelatinized flour may be omitted.

In imitation cheddar-type cheese, there is normally included up to about 2% emulsifying salts, such as disodium phosphate and sodium aluminum phosphate.

"Substantially gas-free", as used herein, means that the product does not have air holes.

In practicing the method of the present invention, the fat is melted and then an emulsion of the fat with water is formed under subatmospheric conditions to remove air from the emulsion. The dry ingredients, which include the calcium caseinate, are blended with the emulsion under high shear mixing, a subatmospheric condition and at a temperature above the melting point of the fat to form a substantially gas-free homogeneous blend of the dry ingredients and the emulsion. The purpose of the subatmospheric condition is to prevent the inclusion of gas in the product. The mixing is done under high shear conditions so that the blending of the dry ingredients with the emulsion takes place completely and quickly. If thorough mixing does not take place quickly, at least two harmful effects are created. One is that the dry ingredients will form lumps surrounded by an oily film which are extremely difficult to break down. The second is that the emulsion will break down and the product will take on a "curdy" appearance rather than a homogeneous blend resembling a pasta filata or cheddar type cheese.

DESCRIPTION OF THE PREFERRED EMBODIMENTS

Figure 1:
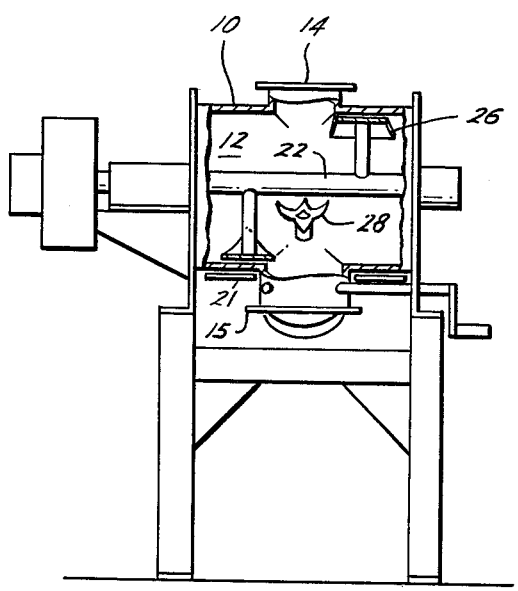
FIG. 1 is a sectional side view of the Littleford-Lodige Model FM130D mixer identified later herein.
Figure 2:
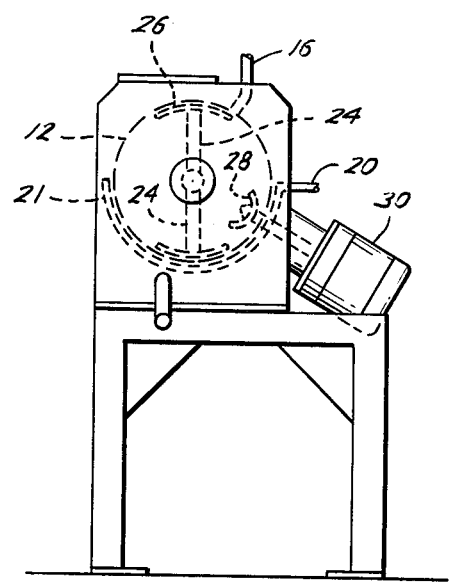
FIG. 2 is an end view of the structure of FIG. 1.

The fat may be any of the edible fats used in shortenings or margarine having a melting point between 90° and 110° F. The preferred fat is refined, bleached and deodorized soybean oil hydrogenated to a melting point of about 95° F. and present in an amount equal to about 22 to 24% of the product.

The preferred ungelatinized flour is tapioca flour.

A product to properly resemble cheddar-type cheese must have proper melt-down characteristics, and to resemble pasta filata-type cheese, for example mozzarella, must also have acceptable stringiness and/or breakdown. Both imitation cheeses need acceptable eating characteristics in cooked and uncooked conditions. To obtain the characteristics of both the pasta filata and cheddar type cheeses, it is necessary in the process of the present invention that, in addition to the fat and water emulsion, there also be included the calcium caseinate, the ungelatinized flour, the particular acid or acids, and the pH must be controlled within the ranges specified. In some instances, if a non-stringy pasta filata-type cheese with greater breakdown tendencies is desired, the ungelatinized flour may be omitted. The ungelatinized flour is used to promote stringiness and also to aid in the firmness of the product which affects its sliceability and shredability. When ungelatinized flour is included, the amount used is preferably between about 1 and 5% of the food.

Either adipic, lactic, citric or malic acids, or combinations of those acids must be included, but the exact chemical reason for this is not fully understood. Their function is to assist in the control of the pH range and to give proper firmness and melting qualities of the product when used on such materials as pizzas. The pH affects the flavor and the stringiness. If the pH is too high or too low, the food will not be stringy, and pasta filata-type cheese normally should be stringy. Also, the slightly acidic condition gives a desirable tart taste to the product. The preferred acid is adipic acid. The preferred amount of adipic acid in a mozzarella-type cheese is about 1.3% and in cheddar-type cheese is about 0.8%.

The acid next most preferable to adipic is lactic acid. Imitation cheese made with lactic acid, when compared to the same product made using adipic acid, has about the same flavor, but has more tendency to crust and burn, has slightly inferior melting properties, has a greater tendency to curdiness, and is not as reliable in reproducability.

Imitation cheese made with citric or malic acid, when compared to the same products made with adipic or lactic acid, have a generally satisfactory flavor, but their other properties are not nearly as favorable, that is, there is much more tendency to crust and burn, more inferior melting properties, greater tendency to curdiness, and less reliability in producability.

This requirement of 0.5 to 1.8% of the use of either adipic, lactic, citric, malic, or combinations thereof, is required, and Applicants are not aware of any other acid that can be substituted. For example, phosphoric, succinic and fumaric acids have been tried and found to be quite unsatisfactory.

For mozzarella-type imitation cheese, the pH of the product should be about 5.1 to 5.5, with about 5.1 being preferred. With a food resembling cheddar cheese, the pH should be about 4.8 to 5.7, with 5.1 being preferred.

In cheddar cheese, the inclusion of an effective amount, up to about 2%, of emulsifying salts to give desired characteristics of melting, shredding and matting. Particularly, they assist in the desirable flow of the melt of the cheese when it is heated on other foods. Preferably about 0.85% disodium phosphate is used.

In making the emulsion of fat and water, the preferred amount of water is approximately 46 or 47% of the weight of the final product. Water content depends on desired firmness of the final product and normally is between about 46 and 52%. Of course, conventional oil and water emulsifiers used in food products may be included. The most satisfactory apparatus known to Applicants to carry out the high shear mixing of the fat and water emulsion with dry ingredients including the calcium caseinate is a Littleford-Lodige high shear mixing vessel sold by Littlefore Brothers, Inc., Cincinnati, Ohio, U.S.A. The desired high shear mixing can be carried out with this equipment in less than four minutes, and preferably within two to three minutes. Referring now to the drawing, the Littleford-Lodige Model FM130D mixer includes a steam-jacketed cylindrical vessel 10 forming a generally horizontal cylindrical chamber 12 which is closed at both ends. A loading door 14 is on the top of the vessel and a discharging door 15 is at the bottom of the vessel 10 in line with the loading door 14. A vacuum line 16 communicates with the chamber 12 near the loading door 14 and a steam connection 20 is provided to admit steam to the steam jacket 21.

An axle 22 extends along the axis of the chamber 12. Extending radially from the axle 22 are a series of arms 24 on the outer end of each of which is a plow-shaped impeller (or mixing element) 26 contoured to fit the inner surface of the chamber 12. These plow-shaped impellers project material being mixed away from the inner surface of the chamber 12 and hurl it toward the axis of the chamber. Protruding from the lower wall of the vessel 10 and into the chamber 12 is a high speed blending chopper driven by a motor 30. The chopper rotates at high speeds of approximately 3,600 r.p.m. to break up agglomerates.

The following are examples of the present invention.

EXAMPLE 1

An imitation mozzarella cheese was prepared from the following ingredients:

| Dry Ingredients | Percent |
| --- | --- |
| Calcium caseinate | 24.55 |
| Tapioca flour | 3.00 |
| Salt (NaCl) | 2.16 |
| Adipic acid | 0.60 |
| Vitamins and minerals | 1.47 |
| Sorbid acid | 0.10 |
| Artificial cheese flavor | 0.50 |
| Fat-Color Blend | |
| Soybean oil hydrogenated to a Wiley melting point of about 95° F. | 21.29 |
| Lactylated monoglyceride emulsifier | 0.05 |
| Red-orange coloring | 0.011 |
| Liquid-Flavor Blend | |
| Various cream, cheese, starter and butter flavors | 0.23 |
| Water-Color Blend | |
| Coloring | 0.05 |
| Water | q.s. to 100% |

It is not necessary that there be coloring in both the fat-color blend and in the water-color blend. Similarly, the flavors need not all be in the liquid-flavor blend. For example, some of the flavoring could be in the dry ingredients and preferably a small amount of imitation cheese flavor is included in the dry ingredients. The particular set of ingredients or blend in which the flavoring or coloring material is placed depends upon the choice of the operator and the characteristics of the particular flavor or coloring material.

If desired, especially to facilitate processing, a portion of the fat can be included in the dry ingredient mix.

The sorbic acid is used to inhibit mold growth when the product is stored under exposure to air.

In this example, the dry ingredients were formed into a dry blend mixture by mixing them in a large Hobart mixer Model M280 at No.2 speed for two minutes. The water-color mixture was prepared at 180° F. and put into a Littleford-Lodige Model FM130D mixer and held at that temperature by the stream jacket on the mixer. The fat-color blend was prepared at 160° and to this was added the liquid-flavor blend which, because of its small amount, need only be prepared at room temperature. This mixture was added to the contents of the Littleford-Lodige mixer and a vacuum of 20 inches of mercury was drawn on the mixer to remove the air entrapped in its contents. After about one minute of mixing at 180° F., the fat and water emulsion was formed. The vacuum was released and the dry blended mixture added to the mixer. A vacuum was again drawn to 20 inches of mercury and held during mixing at about 170° F. After about three minutes of mixing under these high shear conditions, the product, which had a pH of 5.3, was removed from the mixing vessel and packaged. After 3 days' storage at 40° F., it was sufficiently firm to shred or slice properly.

EXAMPLE 2

Using the process of Example 1, an imitation mozzarella cheese having a pH of about 5.1 was prepared from the following ingredients which did not include ungelatinized flour.

| Dry Ingredients | Percent |
| --- | --- |
| Calcium caseinate | 24.65 |
| Salt (NaCl) | 2.50 |
| Adipic acid | 1.30 |
| Vitamins and minerals | 1.47 |
| Sorbic acid | 0.10 |
| Artificial cheese flavor | 0.60 |
| Fat-Color Blend | |
| Soybean oil hydrogenated to a |

| -continued | |
|---|---|
| Wiley melting point of about 95° F. | 22.7 |
| Red-orange coloring | 0.007 |
| Liquid-Flavor Blend | |
| Various cream, cheese, starter and butter flavors | 0.26 |
| Water-Color Blend | |
| Coloring | 0.05 |
| Water | q.s. to 100% |

EXAMPLE 3

Using the process of Example 1, an imitation cheddar cheese was prepared from the following ingredients:

| Dry Ingredients | Percent |
|---|---|
| Calcium caseinate | 24.55 |
| Tapioca flour | 0.20 |
| Salt (NaCl) | 1.50 |
| Adipic acid | 0.80 |
| Sorbic acid | 0.10 |
| Cheese flavor | 0.45 |
| Disodium phosphate | 0.85 |
| Vitamins and minerals | 1.47 |
| Fat | |
| Hydrogenated soybean oil having a Wiley melting point of about 95° F. | 23.70 |
| Color-Flavor Blend | |
| Apocarotenal color | 0.005 |
| Various cream, cheese, starter and butter flavors | 0.39 |
| Water | q.s. to 100% |

This particular variety of imitation cheddar cheese had a pH of 5.1 and resembled natural current cheddar cheese often used in Mexican food dishes. It shredded properly without matting, making the product easy to use. It also melted properly when used in enchiladas which were heated at about 500° F. for three minutes. The melting was sufficient to enhance the eating properties but was not excessive.

EXAMPLE 4

This is an example using a mixture of citric and adipic acids. In this instance, the imitation cheese had 49.2% water, 22.5% calcium caseinate, 3% tapioca flour, 2% modified whey protein, 2% salt, 0.75% citric acid, 0.25% adipic acid, 20% hydrogenated soybean oil and various flavoring agents. The imitation cheese had good slicing and shredability characteristics and on pizzas it performed very well, having a good appearance, no crust and excellent flavor.

EXAMPLE 5

Here, citric acid was used without combining it with adipic, lactic or malic acid. In this example, the imitation cheese had 51.63% water, 1% vegetable gum, 24% calcium caseinate, 1% citric acid, 2.12% salt, 20% hydrogenated vegetable oil, and various artificial flavors. The finished product had good shredability, and when used on pizzas, had good string, very slight curd and a satisfactory appearance.

EXAMPLE 6

Here, lactic acid was used without combining it with adipic, citric or malic acid. In this example, the imitation cheese was comprised of 24.185% calcium caseinate, 3.0% tapioca flour, 0.5% modified whey protein, 2.15% salt, 0.1% sorbic acid, 0.5% artificial flavors, 0.75% lactic acid, 47.0% water and 21.5% hydrogenated vegetable oil, together with various artificial colors. The finished product had good melt, good string and good appearance on pizzas. The flavor was satisfactory although it was not as preferable as a cheese made with adipic acid.

EXAMPLE 7

This is an example using malic acid. This example is the same as Example 6 except that 1.3% malic acid was used in place of the lactic acid. The finished product had fairly good characteristics of sliceability and texture. It melted fairly well on pizzas and had a good appearance and breakdown with only a slight amount of curdiness, but in general was not as acceptable as an adipic acid control sample.

From the foregoing discussion, examples and description of the invention, it is apparent that the objects set forth herein as well as others have been achieved. Those skilled in the art will recognize that the principles of this invention may be applied in several ways, only a few of which have been exemplified here specifically.

What is claimed is:

1. A food resembling mozzarella cheese, said food comprising a substantially gas-free homogeneous blend of:
   (a) an emulsion of water with hydrogenated soybean oil having a Wiley melting point of about 95° F., the water being about 47% and the fat being about 22% of the food,
   (b) about 25% calcium caseinate, and
   (c) about 1.3% adipic acid, said food having a pH of about 5.1.

2. A food resembling cheddar cheese, said food comprising a substantially gas-free homogeneous blend of:
   (a) an emulsion of water and hydrogenated soybean oil having a Wiley melting point of about 95° F., the water being about 46% and the hydrogenated soybean oil being about 24% of the food,
   (b) about 25% calcium caseinate,
   (c) about 0.2% tapioca flour, and
   (d) about 0.8% adipic acid, said food having a pH of about 5.1.

3. A food having a moisture content between about 46 and 52% and resembling cheddar cheese, said food comprising a substantially gas-free homogeneous blend of:
   (a) an emulsion of water with a fat having a Wiley melting point between about 90° and 110° F., the fat being about 12 to 35% of the food,
   (b) about 15 to 33% calcium caseinate;
   (c) about 1 to 5% ungelatinized flour,
   (d) up to about 2% emulsifying salts in an amount effective to give desired characteristics of melting, shredding and matting, and
   (e) about 0.5 to 1.8% of adipic acid,
   said food having a pH of about 4.8 to 5.7.

4. The food of claim 3 in which the ungelatinized flour includes tapioca flour.

5. A food having a moisture content between about 46 and 52% and resembling pasta filata cheese, said food comprising a substantially gas-free homogeneous blend of:
   (a) an emulsion of water with a fat having a Wiley melting point between about 90° and 110° F., the fat being about 12 to 35% of the food,
   (b) about 15 to 33% calcium caseinate, and
   (c) about 0.5 to 1.8% adipic acid, said food having a pH of about 5.1 to 5.5.

6. A process for making a food having a moisture content between about 46 and 52% and resembling cheddar cheese, said food including about 12 to 35% fat having a Wiley melting point of between about 90° and 110° F. and dry ingredients including calcium caseinate in an amount equal to about 15 to 33% of the food, about 1 to 5% ungelatinized flour, up to about 2% of emulsifying salts in an amount effective to give desired characteristics of melting, shredding and matting, and about 0.5 to 1.8% of an acid selected from the class consisting of adipic, lactic, citric, malic, and combinations thereof, the food having a pH of about 4.8 and 5.7, said process comprising,
  (a) melting the fat and then forming an emulsion of it with water under subatmospheric pressure, and
  (b) blending the dry ingredients with the emulsion under high shear mixing, a subatmospheric pressure, and at a temperature above the melting point of the fat to form a substantially gas-free homogeneous blend of the dry ingredients and the emulsion.

7. The process of claim 6 in which the mixing of step (b) takes place in less than about four minutes.

8. The process of claim 6 in which a portion of the fat is included in the dry ingredients.

9. The process of claim 6 in which the acid includes adipic acid.

10. A process for making a food having a moisture content between about 46 and 52% and resembling pasta filata cheese, said food including about 12 to 35% fat having a Wiley melting point of between about 90° and 110° F. and dry ingredients including calcium caseinate in an amount equal to about 15 to 33% of the food and about 0.5 to 1.8% of an acid selected from the class consisting of adipic, lactic, citric, malic, and combinations thereof, the food having a pH of about 4.8 and 5.7, said process comprising:
  (a) melting the fat and then forming an emulsion of it with water under subatmospheric pressure, and
  (b) blending the dry ingredients with the emulsion under high shear mixing, a subatmospheric pressure, and at a temperature above the melting point of the fat to form a substantially gas-free homogeneous blend of the dry ingredients and the emulsion.

11. The process of claim 10 in which the mixing of step (b) takes place in less than about 4 minutes.

12. The process of claim 10 in which a portion of the fat is included in the dry ingredients.

13. The process of claim 10 in which the acid includes adipic acid.

* * * * *